United States Patent [19]

Bergman

[11] Patent Number: 5,367,932
[45] Date of Patent: Nov. 29, 1994

US005367932A

[54] BALE CUTTING MACHINE

[76] Inventor: Ronald H. Bergman, Rte. 1 Box 108, McIntosh, Minn. 56556

[21] Appl. No.: 165,572

[22] Filed: Dec. 13, 1993

Related U.S. Application Data

[63] Continuation of Ser. No. 909,670, Jul. 7, 1992, abandoned.

[51] Int. Cl.5 ............................................. B26D 1/03
[52] U.S. Cl. ................................. 83/425.2; 83/431; 83/527; 83/858
[58] Field of Search .............. 83/856, 858, 132, 431, 83/425.2, 527, 439; 193/3, 17

[56] References Cited

U.S. PATENT DOCUMENTS

| | | | |
|---|---|---|---|
| 2,120,375 | 6/1938 | Shaver et al. | 30/304 |
| 2,398,383 | 4/1946 | Martin | 83/431 |
| 3,105,643 | 10/1963 | Todd | 241/95 |
| 3,152,504 | 10/1964 | Brown | 83/419 |
| 3,217,768 | 11/1965 | Lamb | 83/858 X |
| 3,612,127 | 10/1971 | Benno | 146/70.1 |
| 3,618,649 | 11/1971 | Benno | 146/70.1 |
| 3,736,823 | 6/1973 | Dingler | 83/165 |
| 3,905,497 | 9/1975 | Stedman et al. | 193/17 X |
| 4,051,757 | 10/1977 | Reifenhauser et al. | 83/425.2 X |
| 4,111,087 | 9/1978 | Pankratz et al. | 83/431 X |
| 4,342,242 | 8/1982 | Schaum | 83/437 |
| 5,017,399 | 5/1991 | Montano et al. | 426/636 |
| 5,044,235 | 9/1991 | Lehner | 83/13 |
| 5,099,755 | 3/1992 | Mortano et al. | 83/404 X |
| 5,113,736 | 5/1992 | Meyerle | 83/529 X |

FOREIGN PATENT DOCUMENTS

85257 8/1919 Switzerland .
358063 10/1931 United Kingdom .

*Primary Examiner*—Richard K. Seidel
*Assistant Examiner*—Kenneth E. Peterson

[57] ABSTRACT

A machine has a frame supporting a movable ram for forcing baled material, such as baled hay, into fixed cutting blades to cut the material into sections. A hydraulic piston and cylinder assembly connected to the ram and frame sequentially moves the ram toward and way from the blades to cut material in a chamber between the ram and cutting blades and allow material to be placed into the chambers. A platform mounted on the frame is used to present the baled material to the chamber. A pair of plates pivotally mounted on the frame are moved by the ram to separate the baled material into upper and lower portions that sequentially cut into sections by movement of the ram toward the blades.

16 Claims, 6 Drawing Sheets

BALE CUTTING MACHINE

This is a continuation, of application Ser. No. 07/909,670 filed Jul. 7, 1992, now abandoned.

FIELD OF THE INVENTION

The invention relates to an apparatus for cutting baled material into a plurality of relatively small pieces to facilitate the handling of the material. The invention particularly relates to an apparatus for cutting baled hay or forage into a plurality of sections for mixing with other animal feeds for subsequent livestock consumption.

BACKGROUND OF THE INVENTION

It is a common agricultural practice to bale animal forage, such as hay, into generally rectangular bales to facilitate the handling and storage of the hay. Hay baling machines pick up the hay from windrows and compress the hay into dense tightly packed bales that are held together with a plurality of cords or twine. During the baling process, the stems of the hay are substantially aligned generally perpendicular to the longitudinal axis of the bale. When the twine holding the bale together is removed, the baled hay will not fall apart and will generally stay together into a continuous mass or a series of interlocking portions. The bale of hay must be separated before it can be presented to livestock mixing and feeding equipment and livestock. Machines that break up or cut up the hay generate considerable airborne particulates and dust and are environmentally incompatible with human working conditions as well as the livestock. The machines also separate the leaves from the stems and render the hay unpalatable to livestock.

Machines having a plurality of endless chain type cutters have been used to cut up bales of hay into small pieces. E. L. Benno in U.S. Pat. No. 3,612,127 discloses a hay bale cutter having a housing supporting a plurality of endless chain cutters that are continuously driven to cut up a bale of hay placed on the machine. D. Montano and E. Montano in U.S. Pat. No. 5,017,399 discloses a machine having a plurality of circular power driven and rotary saws oriented to cut the moving bale into sections that are more easily distributed to and eaten by livestock. This machine is relatively large and requires considerable power to drive the rotary saws.

SUMMARY OF THE INVENTION

The invention is directed to an apparatus for cutting a bale of material into a plurality of sections to facilitate utilization of the material. The apparatus cuts baled hay and like animal forage into sections that are readily broken apart with minimum leaf and fiber damage. Plant stems and leaves are not separated so as to maintain the nutritional value of the fodder. In operation, the apparatus does not create excessive airborne particulates and dust. The apparatus can be used in relatively confined areas such as animal feed mixing rooms.

The apparatus has a frame with a chamber to hold material and inlet and outlet openings in communication with the chamber. A platform mounted on the frame is used to support the bale of material and direct the material through the inlet and into the chamber. At least one fixed blade extends across the outlet. The blade has a cutting edge facing the chamber. The blade is mounted on the frame to fix the location of the blade relative to the frame. A plurality of flat blades mounted on the frame in parallel relation to each other are used to cut the material into sections. A movable ram supported on the frame is connected to a power unit operable to move the ram toward and away from the blade. The power unit is a hydraulic fluid operated piston and cylinder assembly connected to the frame and ram to selectively move the ram toward and away from the blade. The ram forces the material in chamber into engagement with the cutting edge of the blade thereby cutting the material into sections.

The ram has a front wall supporting a resilient member facing the chamber. The resilient member is forced into the blade to move the material past the cutting edge so that substantially all of the material is cut by the blade and moved past the blade through the outlet of the frame. The location of the ram relative to the frame is adjustable with spacers to ensure movement of the resilient member into the blade.

The apparatus operates to cut about one-half of the bale of material with a single stroke of the ram. A material separator mounted on the frame operates in response to movement of the ram to spread and cut the bale of material into half sections with one section in the chamber and the other section above the chamber. The separator upon retraction of the ram allows the other section of the material to drop into the chamber. The separator has a pair of plates pivoted to the frame adjacent the top of the chamber. The ram moves the plates from vertical positions to horizontal positions to separate the bale of material. A knife mounted on the ram moves with the ram toward a cutter bar to cut material between the sections of the bale of material.

DESCRIPTION OF PREFERRED EMBODIMENT

Figure 1:
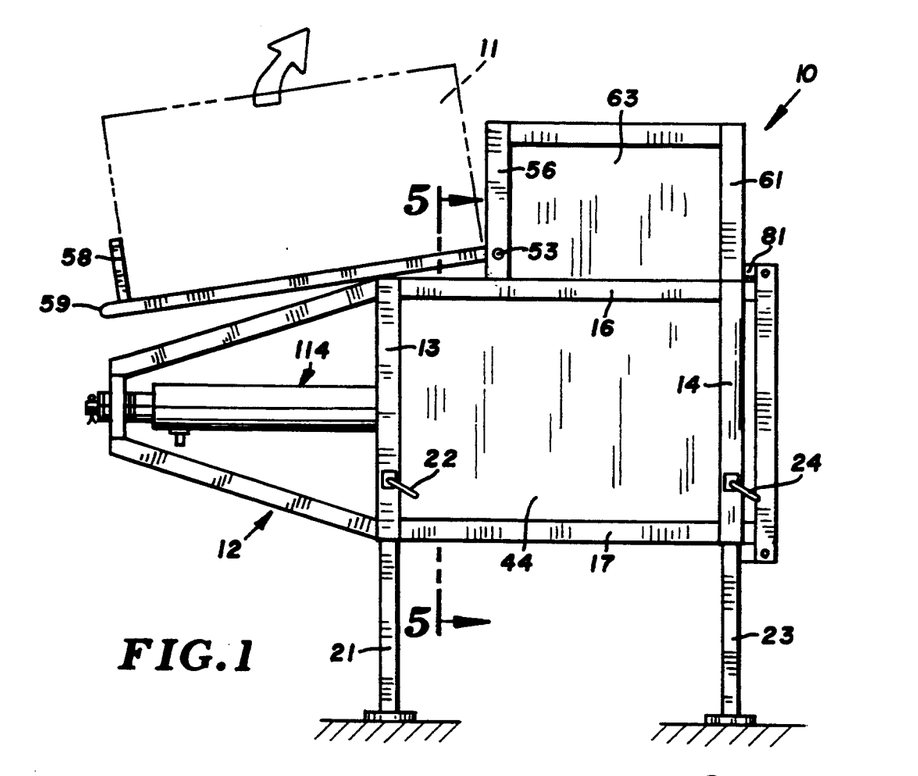
FIG. 1 is a side elevational view of the material cutting machine of the invention.
Figure 2:
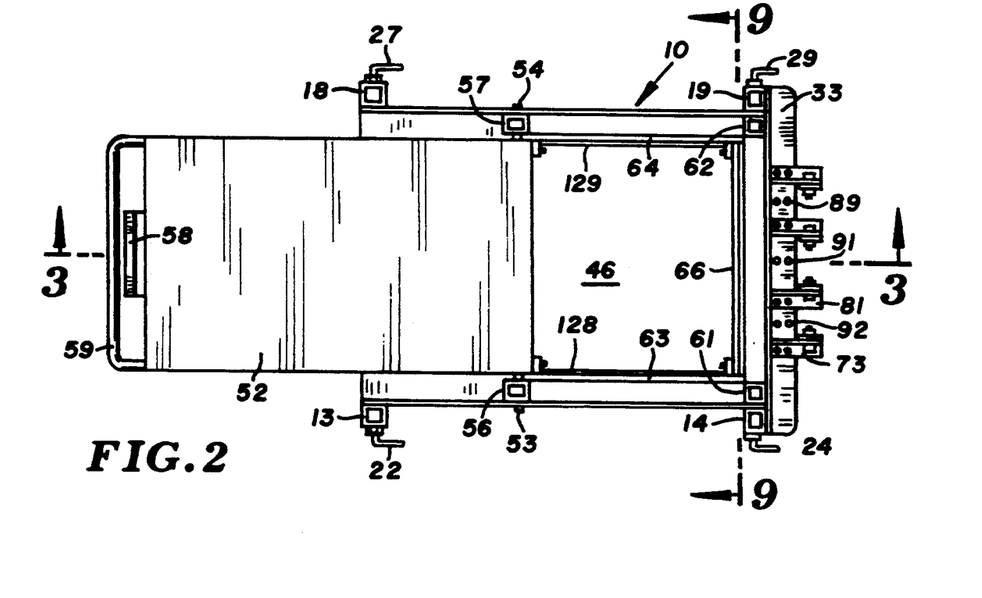
FIG. 2 is a top plan view thereof.

Referring to FIGS. 1 and 2, there is shown a machine 10 for cutting baled material, such as baled hay, animal forage and straw, into elongated sections or pieces for animal consumption and to facilitate the mixing of the material with other animal rations in a feed mixer to make the material more compatible to animals, such as dairy cattle, beef cattle and the like. Machine 10 handles a conventional hay bale 11 and operates to sequentially cut half portions of the hay bale as herein described.

The structure and operation of machine 10 can be used to cut various types of baled materials into sections, including but not limited to paper, plastic and metal. Machine 10 is herein described to cut baled plant materials into a plurality of sections without generating excessive dust and airborne particles. The machine 10 also minimizes the separation of plant leaves from the stems during the cutting of the material into sections.

Figure 4:
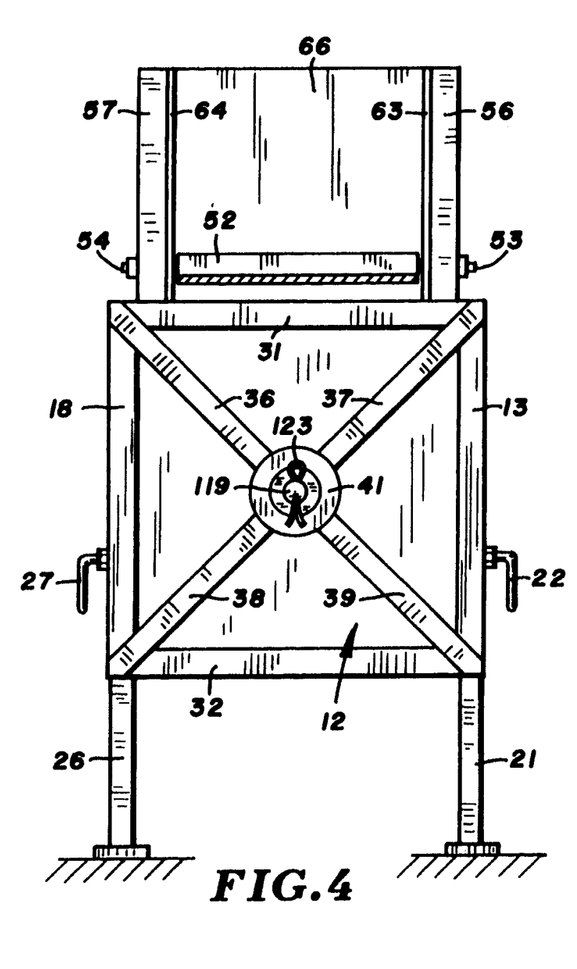
FIG. 4 is a front elevational view thereof.

Machine 10 has a rigid frame, indicated generally at 12, comprising upright tubular frame members 13 and 14 joined to horizontal upper and lower members 16 and 17. The opposite side of frame 12 has upright tubular members 18 and 19. A downwardly directed leg 21 telescoped into tubular member 13 is secured thereto with a lock bolt 22. In a similar manner, leg 23 telescopes into tubular member 14 and is locked thereto with a lock bolt 24. Legs 26 and 28 telescope into the upright tubular members 18 and 19 and are locked thereon with lock bolts 27 and 29. The height of the machine can be adjusted by changing the length of legs 21, 23, 26 and 28 relative to their associated tubular members 13, 14, 18, and 19 with the use of lock bolts 22, 25, 27 and 29. Cross members 31 and 32 connect members 13 and 18. Angle members 33 and 34 connect members 14 and 19. As shown in FIG. 4, frame 12 includes forwardly converging members 36, 37, 38 and 39 joined to an upright plate 41. The outer ends of members 36, 37, 38 and 39 are secured to the opposite ends of upright members 13 and 18.

Figure 3:
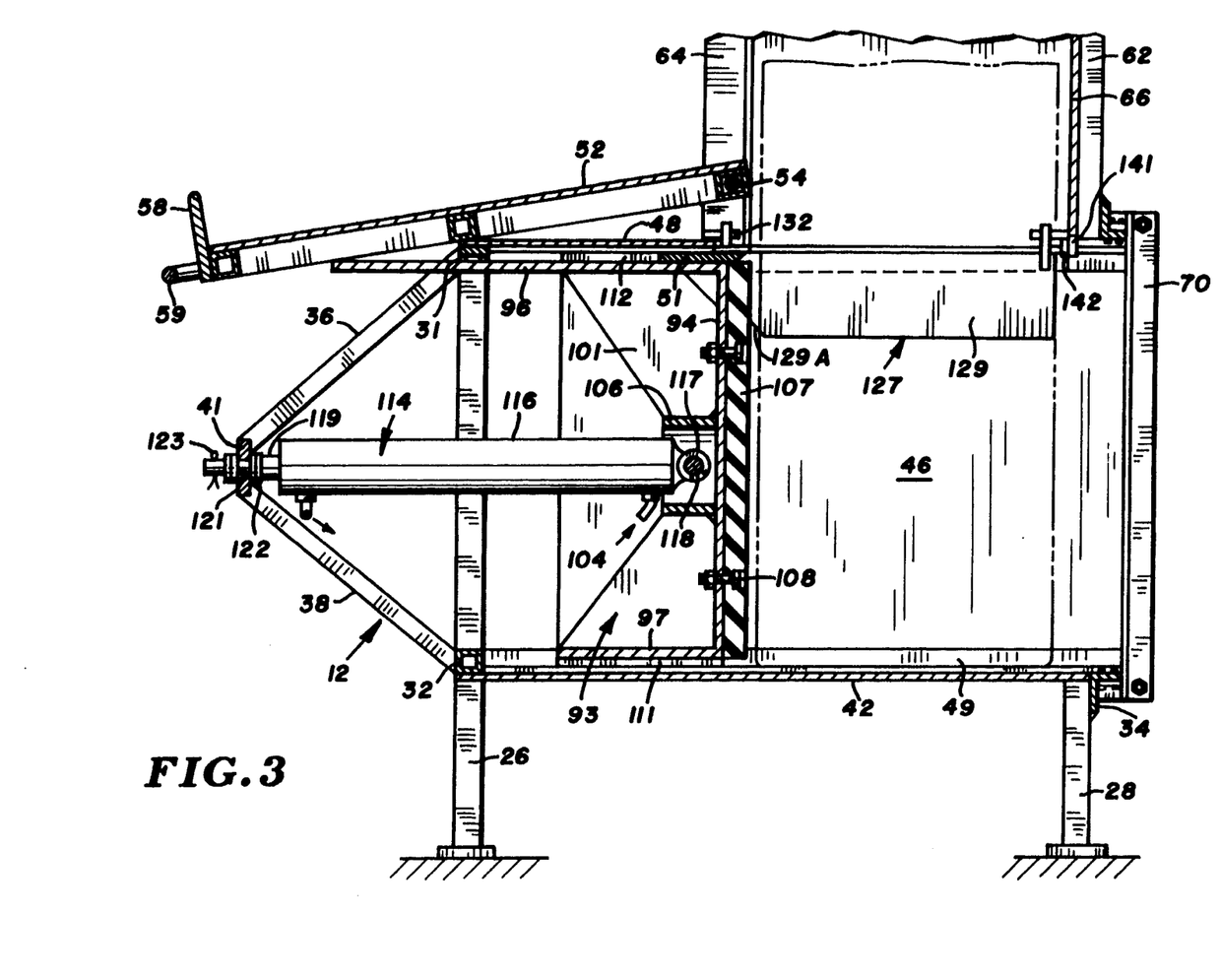
FIG. 3 is an enlarged sectional view taken along line 3—3 of FIG. 2.
Figure 5:
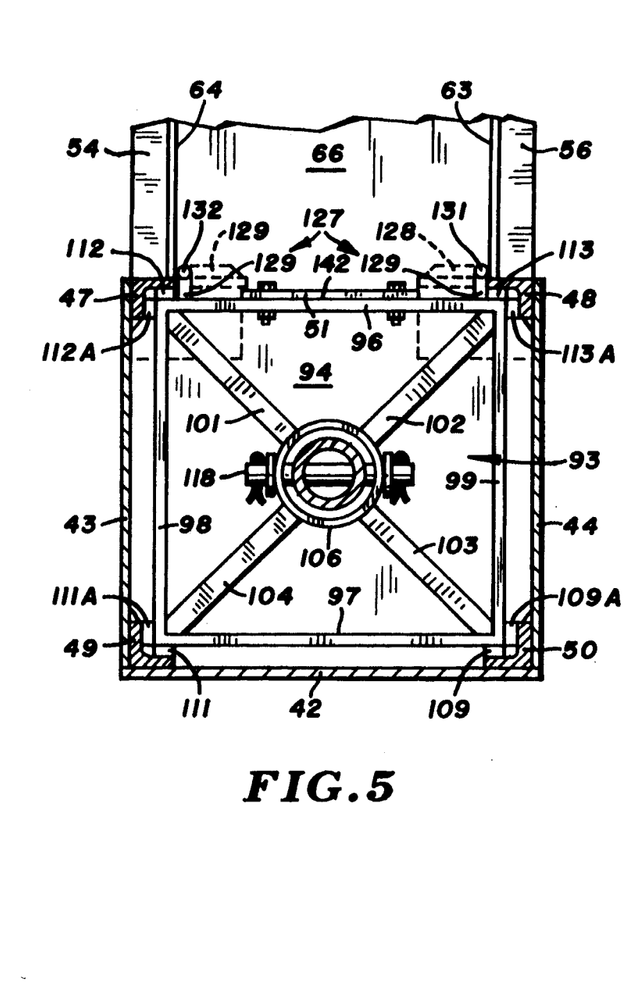
FIG. 5 is an enlarged sectional view taken along the line 5—5 of FIG. 1.

As shown in FIG. 3, a flat horizontal bottom wall 42 extends between and is secured to front cross member 32 and rear angle member 34. As seen in FIG. 5, upright side walls 43 and 44 are joined to the outer sides of bottom wall 42 to form a chamber 46 for accommodating material. The top of frame 12 has a material inlet or opening adjacent chamber 46 to accommodate the lower end of an upright bale of material. Chamber 46 has a size to accommodate about one-half of a conventional sized hay bale. As seen in FIG. 5, the upper edges of side walls 42 and 44 are secured to horizontal upper rails 47 and 48. Lower rails 49 and 50 are secured to the lower corners of side walls 43 and 44. Rails 47, 48, 49 and 50 are linear angle members.

As shown in FIGS. 1 and 2, a bale feeding platform shown as a generally flat platform 52 is used to load bale 11 into chamber 46. A pair of pivot members 53 and 54 join to the forward end of platform 52 are mounted on posts 56 and 57. The posts 56 and 57 extend in a generally upright direction and are secured to upper rails 47 and 48. The outer end of platform 52 has an upright stop plate 58 to prevent the bale from sliding off the platform after the twine around the bale is cut. A generally U-shaped handle 59 secured to the outer end of platform 52 allows the operator to pivot platform 52 to an upright position so that bale 11 will drop into chamber 46. A second pair of posts 61 and 62 are secured to the forward ends of upper rails 47 and 48 and support side walls 63 and 64 and an end wall 66 to form a generally U-shaped upright guide for directing bale 11 into chamber 46 and prevent loose material from falling off the apparatus.

Figure 6:
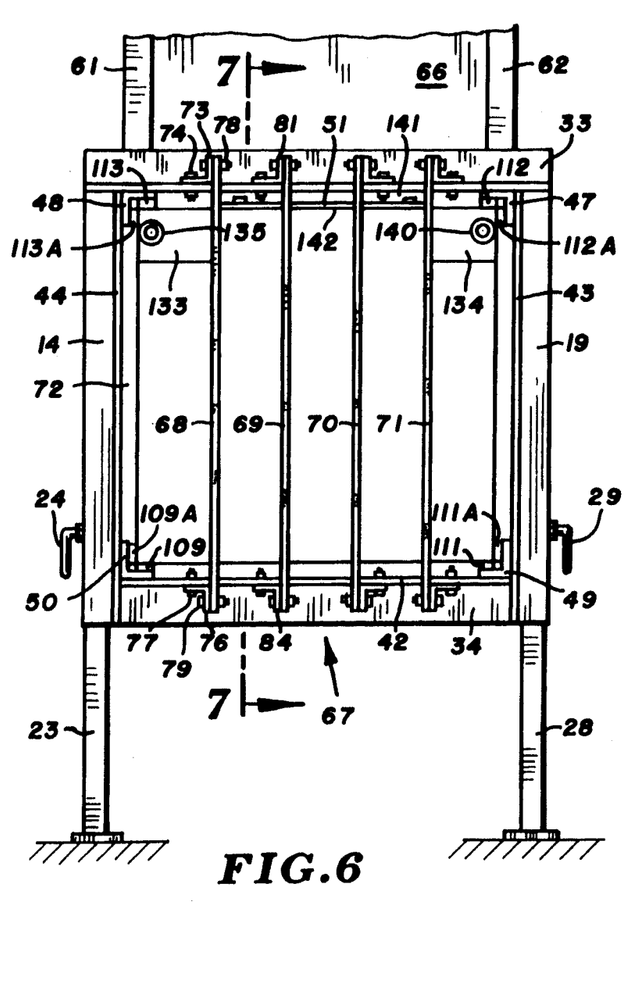
FIG. 6 is an enlarged rear elevational view thereof.
Figures 7, 8:
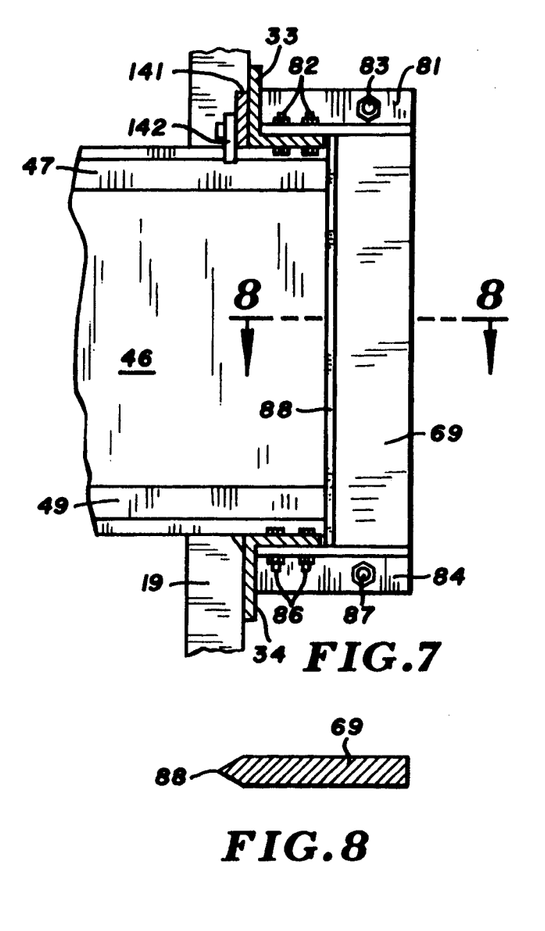
FIG. 7 is an enlarged sectional view taken along line 7—7 of FIG. 6.
FIG. 8 is an enlarged sectional view taken along line 8—8 of FIG. 7.

Referring to FIG. 6, a material cutting assembly indicated generally at 67 is mounted on the rear of frame 12 behind chamber 46. Material cutting assembly 67 has a plurality of side-by-side upright cutting blades 68, 69, 70 and 71. The adjacent blades are laterally spaced from each other so that the material that is forced into the blades is cut into longitudinal strips. The number of blades can vary from one or more blades. Preferably three or four blades are used to cut the material as it is forced into the blades. Material cutting assembly 67 extended across open outlet end 72 of chamber 46 is mounted on cross angle members 33 and 34. As shown in FIG. 6, a top angle member 73 is connected with bolt 74 to the rearwardly directed lip of angle member 33. The bottom angle member 76 is secured with bolts to the cross angle member 34. Bolts 78 and 79 secure the upper and lower ends of blade 68 to angle members 73 and 76. A similar mounting arrangement is used for blade 69 as shown in FIG. 7. Angle member 81 is connected with a pair of bolts 82 to angle member 33. A bolt 83 connects the upper end of blade 69 to angle member 81. The lower end of blade 79 is secured to an angle member 84 connected with bolts 86 to the cross angle member 34. A bolt 87 secures the lower end of blade 69 to angle member 84.

Blade 69, as seen in FIG. 8, has generally flat sides and a forwardly directed vertical knife edge 88 extended along the longitudinal length of the blade. Each blade 68–71 has a longitudinal front cutting edge facing chamber 46. Blades 70 and 71 are mounted on angle members 33 and 34 in a manner similar to the structure used to mount blades 68 and 69 on angle members 33 and 34. Other types of structures can be used to secure the upper and lower ends of blades 68–71 to the frame of the machine.

As shown in FIG. 2, angle member 33 is provided with additional holes 89, 91 and 92 to accommodate bolts to change the location of angle members 73, 81 relative to angle member 33 to adjust the transverse positions of cutting blades 68, 69 and 70 relative to the material outlet at rear of chamber 47.

As shown in FIGS. 3 and 5, a ram indicated generally at 93 is movably mounted on frame 12 for movement into chamber 46 to force the material located in chamber 46 through stationary blades 68–71 thereby cutting the material into sections. Ram 93 has a generally square flat front wall 94 joined to a horizontal top wall 96 and a bottom wall 97. A blade 51 is secured to the mid-section of the front of top wall 96. Side walls 98 and 99 are joined to the top and bottom walls and front walls to complete a box wall structure of the ram. As seen in FIG. 5, diagonal gussets 101, 102, 103 and 104 extend from the corners of ram 93 to a central generally horizontal sleeve or tubular member 106. Gussets 101–104 and sleeve 106 are secured to the back of the front wall by welds or the like.

Figure 11:
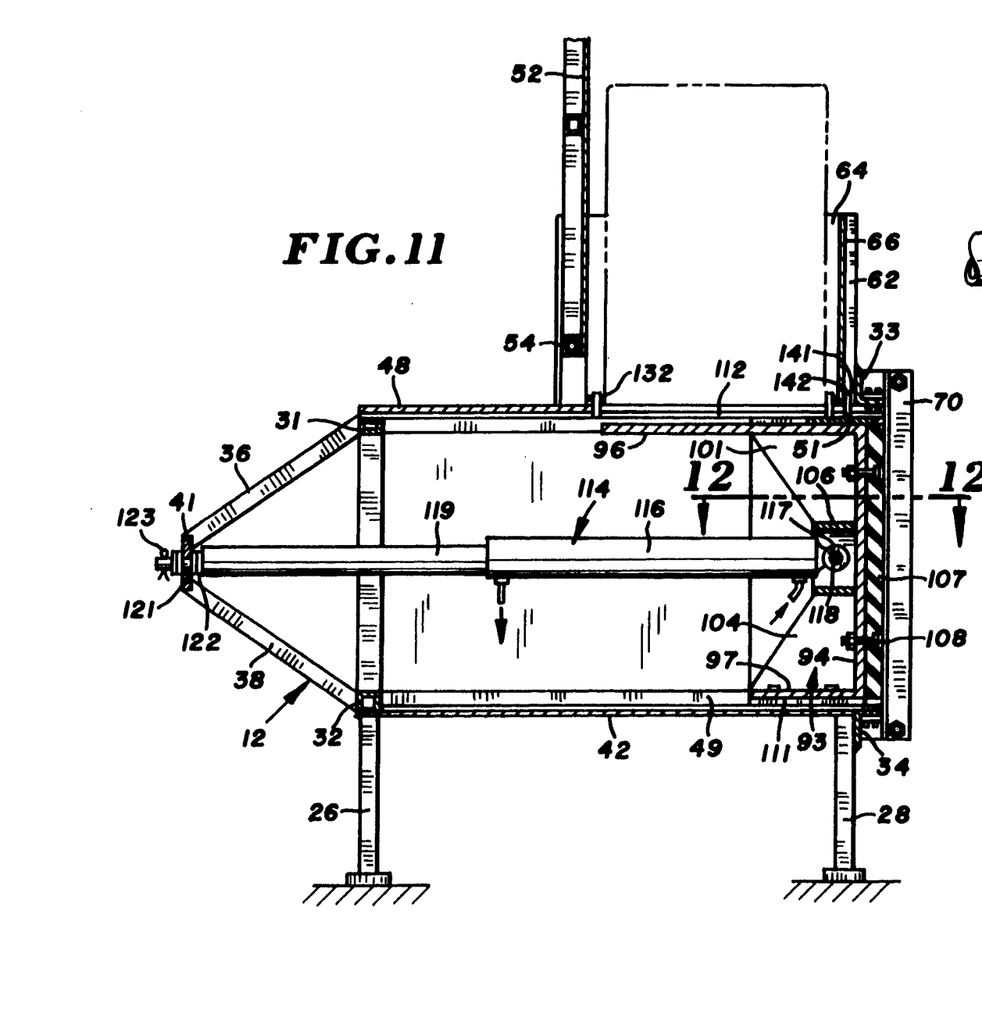
FIG. 11 is a sectional view similar to FIG. 3 showing the material being forced between the cutting blades by the ram.
Figure 12:
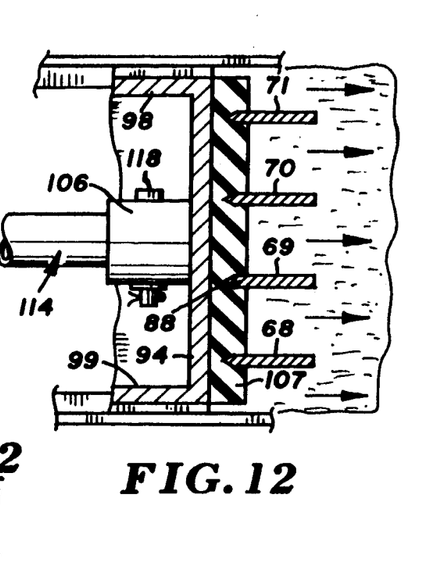
FIG. 12 is an enlarged sectional view taken along line 12—12 of FIG. 11.

As seen in FIG. 3, a rubber mat 107 or similar resilient material is located adjacent the front of front wall 94 and secured thereto with nut and bolt assemblies 108. Other structures can be used to attach the resilient mat 107 to ram 93. The rubber mat 107 can be of relatively resilient rubber materials, such as vehicle tires, that will deform when moved into engagement with knife edges 88 of cutting blades 68–71. As shown in FIG. 11, rubber mat 107 forces the material between adjacent blades on movement of ram 93 toward the blades. The material is forced rearwardly of cutting edges 88 as seen in FIG. 12.

As shown in FIGS. 3 and 5, a pair of longitudinal skid strips or shoes 109 and 111 are located between bottom wall 97 and rails 49 and 51. Strips 109 and 111 are secured to bottom wall 97 and serve as low friction wear members to guide ram 93 along rails 49 and 51. A second pair of skid strips or shoes 112 and 113 are attached to opposite sides of top wall 96, as seen in FIG. 5. Strips 112 and 113 ride along the inside horizontal surfaces of rails 47 and 48, side skid strips or shoes 109A, 111A, 112A and 113A attached to upper and lower sections of side walls 98 and 98 of ram 93 ride on the inside vertical surfaces of rails 47–50. The strips 109, 109A, 111, 111A, 112, 112A and 113, 113A guides ram 93 for linear movement on rails 47, 48, 49 and 50 in both forward and reverse directions. Strips 109, 109A, 111, 111A, 112, 112A and 113 and 113A are high density polyethylene material. Other low friction materials can be used for strips 109, 111, 112 and 113.

As seen in FIG. 3, a generally horizontal hydraulic fluid operated piston and cylinder assembly, indicated generally at 114, is connected to frame 12 and ram 93 for moving ram 93 toward blades 68–71 and retracting ram 93 to its initial position as shown in FIG. 3. Piston and cylinder assembly 114 is an extendible and contractible linear actuator selectively operated by the operator of the machine to move ram 93 relative to cutting blades 68–71. Other types of power units such as screw linear actuator operated with an electric or hydraulic motor or an elongated lead screw turned with a motor can be used to move ram 93. Piston and cylinder assembly 114 has an elongated cylinder 116 joined to a transverse connector or sleeve 117 accommodating a pin 118 that pivotally connects the forward end of the cylinder to ram sleeve 106. The opposite end of cylinder 116 accommodates a piston rod 119 attached to a piston (not shown) slidably positioned within cylinder 16. Piston rod 119 has a boss extended through a hole 121 in plate 41. A plurality of spacer washers 122 are located between plate 21 and a shoulder 120 on piston rod 119 to adjust the longitudinal position of ram 93 relative to frame 12 and blades 68–71. This adjusts the stroke of ram 93 so that mat 107 will move into engagement with cutting blades 68–71. The outer end of rod 119 accommodates a Cotter key to hold rod 119 in assembled relation with plate 121. A pair of fluid lines or hoses 124 and 126 are connected to opposite ends of cylinder 116 for selectively carrying hydraulic fluid under pressure to and from cylinder 116. The fluid lines 124 and 126 can be connected to the hydraulic power system of a tractor or other suitable sources of hydraulic fluid under pressure. A hand operated valve (not shown) having a pressure relief check valve is used to selectively control the flow of hydraulic fluid to and from the opposite ends of cylinder 116 thereby reciprocating ram 93 into and out of chamber 46.

Figure 9:
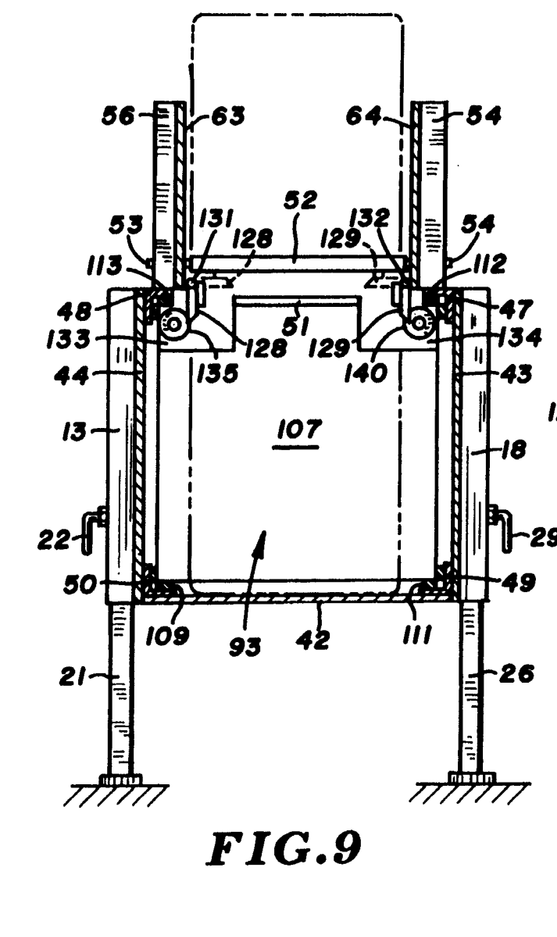
FIG. 9 is an enlarged sectional view taken along line 9—9 of FIG. 2.

Machine 10 has bale separators, indicated generally at 127 in FIG. 9, operable to separate the lower half of a bale of material located in chamber 46 from the upper half thereof. Bale separator 127 allows ram 93 to effectively move one-half of the material through cutting blades 68–71 with a minimum of interference from the material that is located above chamber 46. Separators 127, in addition to separating the material, hold the upper portion of the material above chamber 46 during the forward movement of ram 93 as well as the retraction of the ram back to its initial position. When ram 93 has reached its full retracted position, as shown in FIG. 3, the bale separators 127 allow the upper half of the material to fall down into chamber 46 whereby ram 93 can move forward to move the material in chamber 46 through cutting blades 68–71 thereby slicing the material into sections. Bale separators 127 comprises a pair of generally rectangular plates 128 and 129 hinged at 131 and 132 to the upper rails 47 and 48, as seen in FIG. 5. Plates 128 and 129 are normally in down or vertical positions to allow the material to be loaded into chamber 46. Springs can be used to bias plates 128 and 129 to the down positions. The weight of the upper section of the baled material also forces plates 128 and 129 to pivot to their down positions. Plates 128 and 129 have rearwardly and downwardly inclined front edges 129A that engage rearwardly and upwardly inclined portions 133 and 134 of the upper front wall 94 of ram 93. On forward movement of ram 93 inclined portions 133 and 134 engage the front edges of plates 128 and 129 and rotate plates 128 and 129 in an upward direction to dotted line positions, as shown in FIGS. 5 and 9. The plates 128 and 129 also ride on rollers 135 and 140 as they rotate upwardly. The top of ram 93 holds plates 128 and 129 generally horizontal. As plates 128 and 129 swing to their horizontal positions, they move into the sides of the material and separate the lower portion of the material from the upper portion thereof.

A cross bar 141 is secured to the frame members 61 and 62 forwardly of the cutting blades 68–71. A cutter bar 142 is connected with bolts to the middle section of bar 141 in alignment with blade 51 on ram 93. Cutter bar 142 is vertically adjustable on cross bar 141 to provide adjustment of the clearance between blade 51 and the lower edge of cutter bar 142. Movement of ram 1 toward blades 68–71 also moves blade 51 past cutter bar 142 thereby cutting material that is between blade 51 and cutter bar 112.

Figure 10:
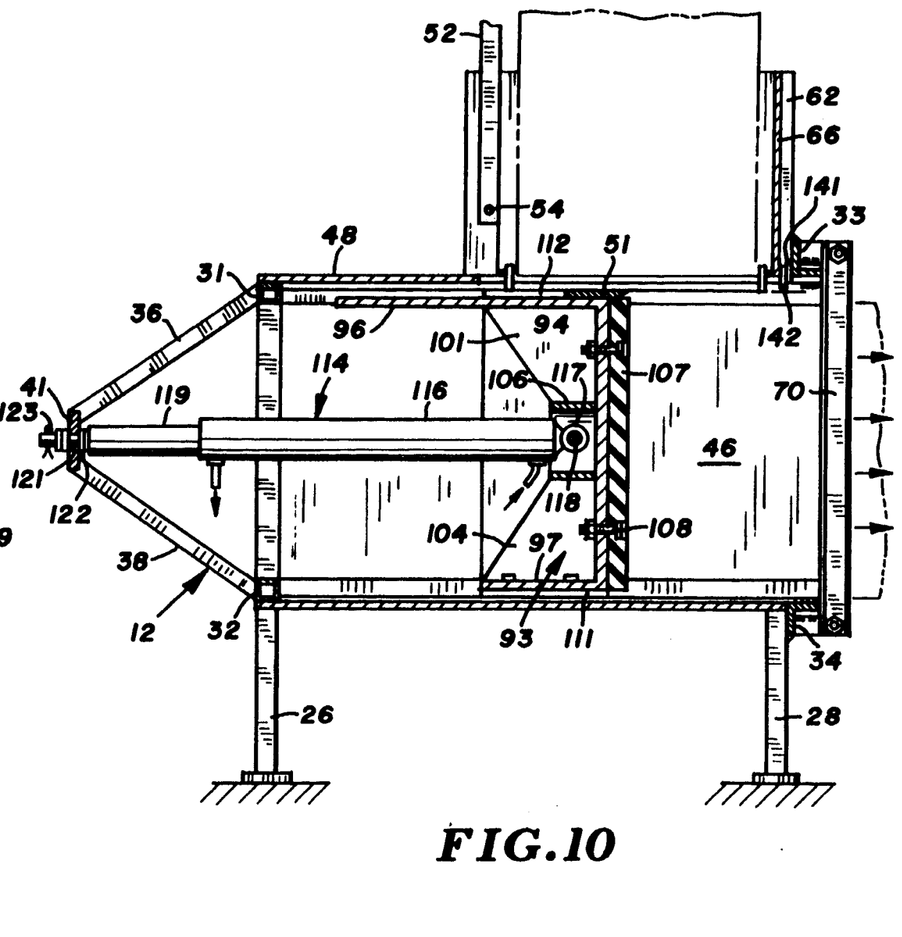
FIG. 10 is a sectional view similar to FIG. 3 showing the material in the chamber being moved by the ram through the stationary cutting blades.

In use, the piston and cylinder assembly 114 is initially in the retracted position locating ram 93 in front of chamber 46. The loading platform 52 is in its down position, as seen in FIGS. 1 and 3. Hay bale 11 is placed on the loading platform 52. Fasteners, such as twine, around hay bale 11 are cut and removed. The operator then uses handle 59 to pivot platform 52 to a generally vertical position as shown in FIG. 10. This moves bale 11 in a generally upright position. Bale 11 falls into the chamber 46 and rests on the bottom wall 42. About half of bale 11 is located within chamber 46. The upper half of the bale extends above chamber 46.

The piston and cylinder assembly 114 is then operated with use of a manually operated valve to allow fluid under pressure to expand the piston and cylinder assembly 114. This moves ram 93 is a forward direction toward fixed cutting blades 68–71. The inclined sections 133 and 134 will initially engage the inclined front edges 129A of plates 128 and 129 to pivot the plates to their generally horizontal positions. Rollers 140 and 145 also assist in pivoting plates 128 and 129 upwardly. This separates the material of the bale in the approximate center of the bale into two portions. The lower portion of the bale is located within chamber 46. The upper portion thereof is located within the housing formed by walls 63, 64 and 66. Ram 93 initially compresses the bale in chamber 46. When sufficient force is placed on the material in chamber 46, the material will be cut by the blade 51 and cutter bar 142 and cutting blades 68–71 into sections determined by the lateral space between adjacent blades 68–71 and the space between the side blades 68 and 71 and the side walls of the machine. Ram 94 moves through chamber 46 and forces rubber mat 107 into engagement with the knife edges 88 of blades 68–71. This cuts all of the material that was located within chamber 46 and forces the material through the spaces between adjacent blades 68–71. The piston and cylinder assembly 114 is then retracted to move ram 94 back to its initial position. Separator plates 128 and 129 will then pivot to their down or vertical positions allowing the upper portion of the material to drop into chamber 46. The piston and cylinder assembly 114 is then again actuated to move the material in chamber 46 through the blades 68–71 thereby cutting the material into sections.

While there has been shown and described a preferred embodiment of the machine for cutting baled materials, it is understood that changes in the structure, arrangement of structure, and composition of this structure may be made by those skilled in the art without departing from the invention. The invention is defined in the following claims.

I claim:

1. An apparatus for cutting a bale of material into a plurality of sections comprising:
a frame having a top portion including a top inlet opening to accommodate a portion of a bale of material, an outlet opening spaced from the inlet opening, and a chamber between the inlet and outlet openings for accommodating a portion of the bale of material, platform means for holding the bale of material extended laterally from the inlet opening, pivot means movably mounting the platform means for holding the bale of material on the frame for movement from a first down position for holding the bale of material to a second upright position whereby a portion of the bale of material moves through the inlet opening into the chamber, a U-shaped guide means mounted on the top portion of the frame having a passage open to the opening and an opening facing the platform means whereby when the platform means is moved to the second upright position, the bale of material moves into the passage and said portion of the bale of material drops into said chamber, said pivot means connecting the platform means to the guide means, blade means having cutting edges facing the chamber, means mounting the blade means on the frame across the outlet opening, ram means movably mounted on the frame for movement into the chamber toward said blade means to force the portion of the bale of material in the chamber into the blade means whereby the portion for the bale of material is cut into sections, and means connected to the frame and ram means operable to selectively move the ram means toward and away from the blade means.

2. The apparatus of claim 1 wherein:
the chamber extends in a generally horizontal direction, said outlet opening located generally normal to the inlet opening whereby said portion of the bale of material drops down into said chamber and is horizontally moved by the ram means toward the blade means to cut the portion of the bale of material into sections.

3. The apparatus of claim 1 including:
knife means mounted on the ram means, and cutter bar means mounted on the frame adjacent the outlet opening whereby on movement of the ram means toward the blade means the portion of the bale of material is cut from the remaining portion of the bale of material.

4. The apparatus of claim 1 wherein:
the platform means for holding the bale of material includes a generally flat bottom wall providing a support for the bale of material.

5. The apparatus of claim 1 wherein:
the blade means comprise a plurality of generally flat rigid members having the cutting edges along longitudinal forward edges thereof.

6. The apparatus of claim 1 wherein:
the platform means includes a generally flat bottom wall having an inner end located adjacent the opening and an outer end, and handle means joined to the outer end of the platform means to facilitate manual movement of the platform means from the down position to the upright position.

7. The apparatus of claim 6 wherein:
the bottom wall of the platform means inclines downwardly from the inner end thereof when the platform means is in the down position.

8. The apparatus of claim 1 wherein:
the frame includes a pair of longitudinal rails located along the bottom of said chamber, said ram means having means slidably engaging said rails to guide said ram means for movement toward and away from the blade means.

9. The apparatus of claim 1 wherein:
the means operable to move the ram means comprises a piston and cylinder assembly operable in response to fluid under pressure.

10. The apparatus of claim 9 including:
spacer means between the frame and piston and cylinder assembly for adjusting the location of the ram means relative to the blade means.

11. An apparatus for cutting a bale of material into a plurality of sections comprising:
a frame having an inlet opening, an outlet opening, and a chamber between the inlet and outlet openings for accommodating a portion of the bale of material, means for holding the bale of material, means movably mounting the means for holding the baled material on the frame for movement from a first position for holding the bale of material to a second position whereby a portion of the material moves through the inlet opening in to the chamber, blade means having cutting edges facing the chamber, means mounting the blade means on the frame across the outlet openings, ram means movably mounted on the frame for movement into the chamber toward said blade means to force the portion of the bale of material in the chamber into the blade means whereby the portion for the bale of material is cut into sections, means connected to the frame and ram means operable to selectively move the ram means toward and away from the blade means, the ram means has a generally horizontal top wall and a generally vertical from wall, knife means connected to the top wall, said knife means having a generally horizontal cutting edge located forwardly of the front wall, and cutter bar means mounted on the frame, said cutter bar means extended across the top of said outlet opening whereby on movement the knife means and the cutter bar means is cut thereby separating the portion of the bale of material in the chamber from the remaining portion of the bale of material.

12. The apparatus of claim 1 including:
knife means for separating the portion of the bale of material in the chamber from the remaining portion of the bale of material during movement of the ram means toward the outlet opening of the frame.

13. An apparatus for cutting a bale of material into a plurality of sections comprising:

a frame having a top portion including a top inlet opening to accommodate a portion of a bale of material, upright guide means having a passage open to the inlet opening, an outlet opening spaced from the inlet opening, and a chamber between the inlet and outlet openings for accommodating a portion of the bale of material, platform means for holding the bale of material extended laterally from the upright guide means, said guide means having an opening facing the platform means and open to said passage, pivot means movably mounting the platform means for holding the bale of material on the frame for movement from a first down position for holding the bale of material to a second upright position whereby a portion of the bale of material moves into the passage of the guide means and through the inlet opening into the chamber, blade means having cutting edges facing the chamber, means mounting the blade means on the frame across the outlet opening, ram means movably mounted on the frame for movement into the chamber toward said blade means to force the portion of the bale of material in the chamber into the blade means whereby the portion for the bale of material is cut into sections, and means connected to the frame and ram means operable to selectively move the ram means toward and away from the blade means.

14. The apparatus of claim 13 including:

knife means for separating the portion of the bale of material in the chamber from the remaining portion of the bale of material during movement of the ram means toward the outlet opening of the frame.

15. The apparatus of claim 13 wherein:

the blade means comprise a plurality of generally flat members having cutting edges along longitudinal forward edges thereof.

16. The apparatus of claim 13 wherein:

the means operable to move the ram means comprises a piston and cylinder means operable in response to fluid under pressure, and spacer means between the frame and piston, and cylinder means for adjusting the location of the ram means relative to the blade means.

* * * * *